US006079971A

United States Patent [19]

Ramond

[11] Patent Number: 6,079,971

[45] Date of Patent: Jun. 27, 2000

[54] INJECTION ASSEMBLY FOR A PLASTIC INJECTION MOULD AND METHOD FOR MAKING THE ASSEMBLY

[75] Inventor: Louis Maurice Ramond, Bagnolet, France

[73] Assignee: L.M.R., Bagnolet, France

[21] Appl. No.: 08/776,493

[22] PCT Filed: May 29, 1996

[86] PCT No.: PCT/FR96/00806

§ 371 Date: May 6, 1997

§ 102(e) Date: May 6, 1997

[87] PCT Pub. No.: WO96/38284

PCT Pub. Date: Dec. 5, 1996

[30] Foreign Application Priority Data

May 30, 1995 [FR] France .................................. 95 06367
Mar. 12, 1996 [FR] France .................................. 96 03092

[51] Int. Cl.$^7$ ................................................ B29C 45/22

[52] U.S. Cl. .......................... 425/549; 425/570; 425/572

[58] Field of Search .................................. 425/549, 570, 425/572

[56] References Cited

U.S. PATENT DOCUMENTS

| | | | |
|---|---|---|---|
| 4,832,254 | 5/1989 | Peuke et al. | 249/79 |
| 5,096,411 | 3/1992 | Gellert | 425/572 |
| 5,227,179 | 7/1993 | Benenati | 425/570 |
| 5,346,388 | 9/1994 | Gellert | 425/549 |

FOREIGN PATENT DOCUMENTS

| | | |
|---|---|---|
| 0 262 490 | 4/1988 | European Pat. Off. . |
| 0 425 981 | 5/1991 | European Pat. Off. . |
| 0 457 166 | 11/1991 | European Pat. Off. . |
| 0 590 678 | 4/1994 | European Pat. Off. . |
| 2145266 | 9/1971 | Germany . |
| 27 34 746 | 2/1979 | Germany . |
| 90 12 232 | 8/1990 | Germany . |

OTHER PUBLICATIONS

G. Bagusche, *Kunststoffe,* vol. 85, No. 2, Feb. 1995, p. 176.

*Primary Examiner*—Tim Heitbrink
*Attorney, Agent, or Firm*—Seidel, Gonda, Lavorgna & Monaco, PC

[57] ABSTRACT

An injection assembly of low thermal mass which has a molded bearing plate which reduces the total amount of material required and thus the amount of heating or cooling necessary to raise or lower the temperature of the injection assembly. The assembly includes a molded bearing plate with structural ribs and a cast heating distributor connectable to the matrix of an injection mold. The heating distributor has connectors for at least one central nozzle for receiving plastics material and connectors for at least one injection nozzle for injecting the plastics material into the injection mould, and branches containing ducts for transferring the plastics material from the at least one central nozzle to the at least one injection nozzle. The branches include a heater for controlling the temperature of the heating distributor, and at least one central nozzle and at least one injection nozzle.

13 Claims, 6 Drawing Sheets

2C
2B
2
2A
5
5
5
5
5
3
3
4B
1
6
4
4A

FIG.2
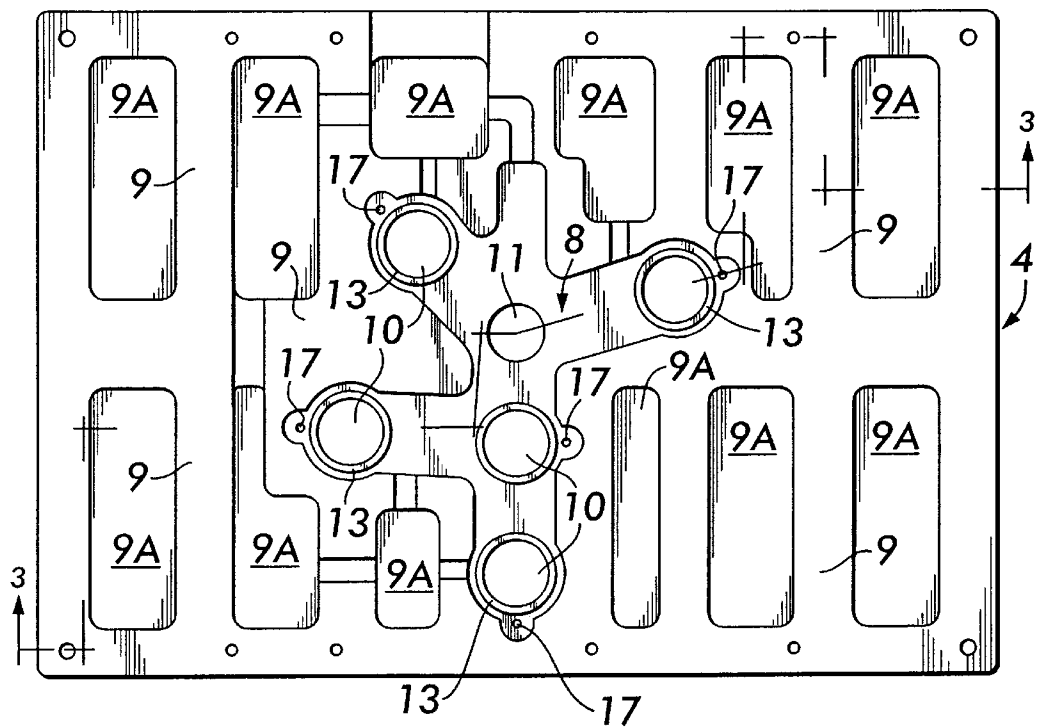
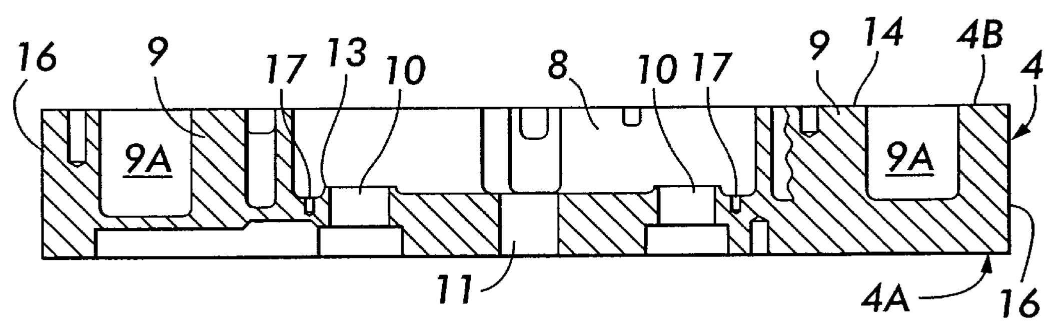
FIG.3

35
2B
34
54A
2
5A
33
22 (20)
2
23
53A
52A
2A
23A
51A
27
32
32'
28
4B
1
26
30
27'
31
4
13
29
24
17
4A 133
105A
154A
153A
102
1295
151A
1293
1292
1296
1295
102A
104B
120
132
126
123
134
131
101
130
1297
127
132
1291
129
1294
104A
104

INJECTION ASSEMBLY FOR A PLASTIC INJECTION MOULD AND METHOD FOR MAKING THE ASSEMBLY

BACKGROUND OF THE INVENTION

The present invention relates to an injection assembly for a plastics material injection mould, and for a process for producing an assembly of this type.

More particularly, the invention relates to an injection assembly for a plastics material injection mould, comprising:

heating nozzles for injecting the plastics material into the mould;

these nozzles being supplied with plastics material by at least one central nozzle, from the barrel extruder;

means for controlling the nozzles and for heating the supply ducts of the nozzles;

this injection assembly being intended to be mounted on the matrix of the injection mould.

At present, for the injection of large-scale parts in plastics material, for example those intended for the automobile industry, the injection mould is equipped with an injection assembly comprising heating nozzles to allow the plastics material to be injected, simultaneously, at different locations on the mould in order to ensure a rapid and very uniform distribution of the plastics material inside the mould, a condition which is indispensable for the manufacture of large-scale parts with good mechanical and aesthetic properties.

This injection assembly is currently produced by machining a forged steel block, in which there are provided passages for accommodating the nozzles, the supply ducts of the nozzles and the ducts for supplying the control fluid for the nozzle valves, for heat-exchanging fluid, or for electric supply cables to pass through.

These machining operations are extremely long because it is necessary to remove a significant part of the material; these operations are also very delicate and the injection assembly is not always satisfactory as regards the distribution of heat, the uniformity of the temperature inside the assembly, etc.

SUMMARY OF THE INVENTION

The object of the present invention is to rectify these drawbacks and it proposes the creation of an injection assembly which can be produced in a particularly simple and efficacious manner, allowing a perfect adaptation to any arrangement of injection nozzles, ie. to any shape of part to be injected, controlling the problems of regularity of the temperature and allowing, in a general manner, injected products of excellent quality to be produced.

To this end, the invention relates to an injection assembly of the type defined hereinabove, characterized in that it comprises:

a bearing plate bearing a heating distributer provided with injection nozzles;

A—the bearing plate is a cast iron or moulded steel part provided with reinforcing ribs and a reserved space for accommodating the heating distributor, and positioning supports for the heating distributor;

B—the heating distributor is a part forming an assembly of heating ducts connected to at least one plastics material input point (central nozzle) and to injection nozzles comprising;

connectors accommodating the nozzles and acting as supports, in the vicinity of which the heating distributor is supported on the bearing plate;

branches connecting the connectors of the injection nozzles and the connector of the central nozzle.

The injection assembly according to the invention has multiple advantages both as regards the design and the manufacture and as regards the application. Since the injection assembly is formed of two separate parts, its design is particularly flexible and simple to produce, the more so since these parts are made of cast iron or moulded steel.

The machining, ie. the time which is necessary for forming these two parts, is extremely reduced since the work on the machine is limited to the machining of the reference faces, supporting faces, and centerings for the nozzles.

This reduction of time is considerable in relation to the machining time for the injection assembly according to the prior art, the more so when large scale parts are involved.

The assembly according to the invention is much lighter than that of the prior art, with the result that the time taken to increase the temperature is reduced in the same proportions.

The heat insulation between the heated part of the assembly, ie. the heating distributer and the nozzles, limits the waste of heat and facilitates the control of the temperature of these parts which are directly in contact with the plastics material the temperature of which is to be maintained.

The breakdown of the distributer into single, absolutely necessary functional parts: the connectors for the support of the nozzles and the branches forming the ducts and constituting the support of the connectors and also of the nozzles, results in a part which is to heated and regulated and is of very low mass which permits a significant improvement of the yield of the mould and of the quantity of the plastics material moulded parts.

The positioning of the heating means (armoured and closed electrical resistances) in the channels or grooves of the branches and the connectors ensures an efficiacious heating of the plastics material; this positioning of the armoured and closed electrical resistances is extremely simple and rapid, the more so since there is not, in general, more than one single continuous groove along the top and one single continuous groove along the underside in such a manner that there are only two armoured and closed electrical resistances.

The ducts and nozzles being very accessible, the positioning of temperature sensors is simple and the thermal inertia, or the response time, is reduced to the minimum.

According to a further advantageous feature of the invention, the branches of the heating distributor have a rectangular cross-section, through which there passes, approximately in its centre, an aperture forming the plastics material duct and comprising, in at least some of its faces, grooves intended to accommodate an armoured and closed electrical resistance.

These grooves are preferably produced at the time when the distributor is cast and they do not require any special machining.

According to other features, the branches comprise four grooves produced in the faces of the branches to accommodate the armoured and closed electrical resistances, and these grooves continue around the connectors.

According to further features, the heating distributor comprises perforated tabs intended for securing the distributor in its reserved space in the bearing plate.

According to further features, the heating distributor is supported on the bearing plate by means of intercalated heat-insulating elements.

This support of the distributor solely in the vicinity of the connectors offers the advantage of allowing an efficacious heat decoupling between the distributor and the bearing plate whilst still ensuring an excellent hold of the nozzles, since the support and the securing of the distributor are performed in the vicinity of the connectors.

According to a further particularly advantageous feature of the invention, the distributor comprises, at the location of the injection nozzles, through apertures which accommodate a head provided with a skirt forming, together with the body, a shoulder by means of which the head is pressed against one of the faces of the distributor, the other threaded end of the head accommodating a nut which likewise serves for support on the base of the bearing plate, the skirt itself forming a support for the front face of the matrix, about the passage accommodating the nozzle, screwed with its threaded end into a thread provided in the skirt.

The invention also relates to a process for the production of the assembly and, in particular, of the heating distributor.

This process is characterised in that:

an impression of the distributor, consisting of modular elements for the connectors and branches connecting the connectors is produced;

the elements of the connectors are positioned according to the locations provided for the nozzles;

the connection branches, which have been cut out, are positioned in a profiled section and the junctions between the cores and the connection branches are covered to obtain continuity of the transitory faces;

the mould is produced using the impression of the distributor;

the steel is cast;

the ducts, the apertures of the nozzles and the reference faces of the connectors are machined;

the nozzles and the armoured and closed electrical resistances are positioned in the distributor;

the distributor, thus equipped, is mounted on the bearing plate which is produced separately, of cast iron or moulded steel; and the supply means of the bearing plate are connected to the distributor.

The manufacturing process of the foundry model is simple and flexible since the latter is produced by modular machinery using only two types of element: the connectors for the nozzles and the profiled sections cut to length for the branches.

BRIEF DESCRIPTION OF THE DRAWING

The present invention will be described hereinbelow in a more detailed manner with reference to an embodiment of an injection assembly shown in the attached drawings, in which:

FIG. 2 shows a top view of a bearing plate of an injection assembly according to the invention;

FIG. 3 shows a sectional view along the broken line III—III in FIG. 2;

DESCRIPTION OF THE PREFERRED EMBODIMENT

Figure 1:
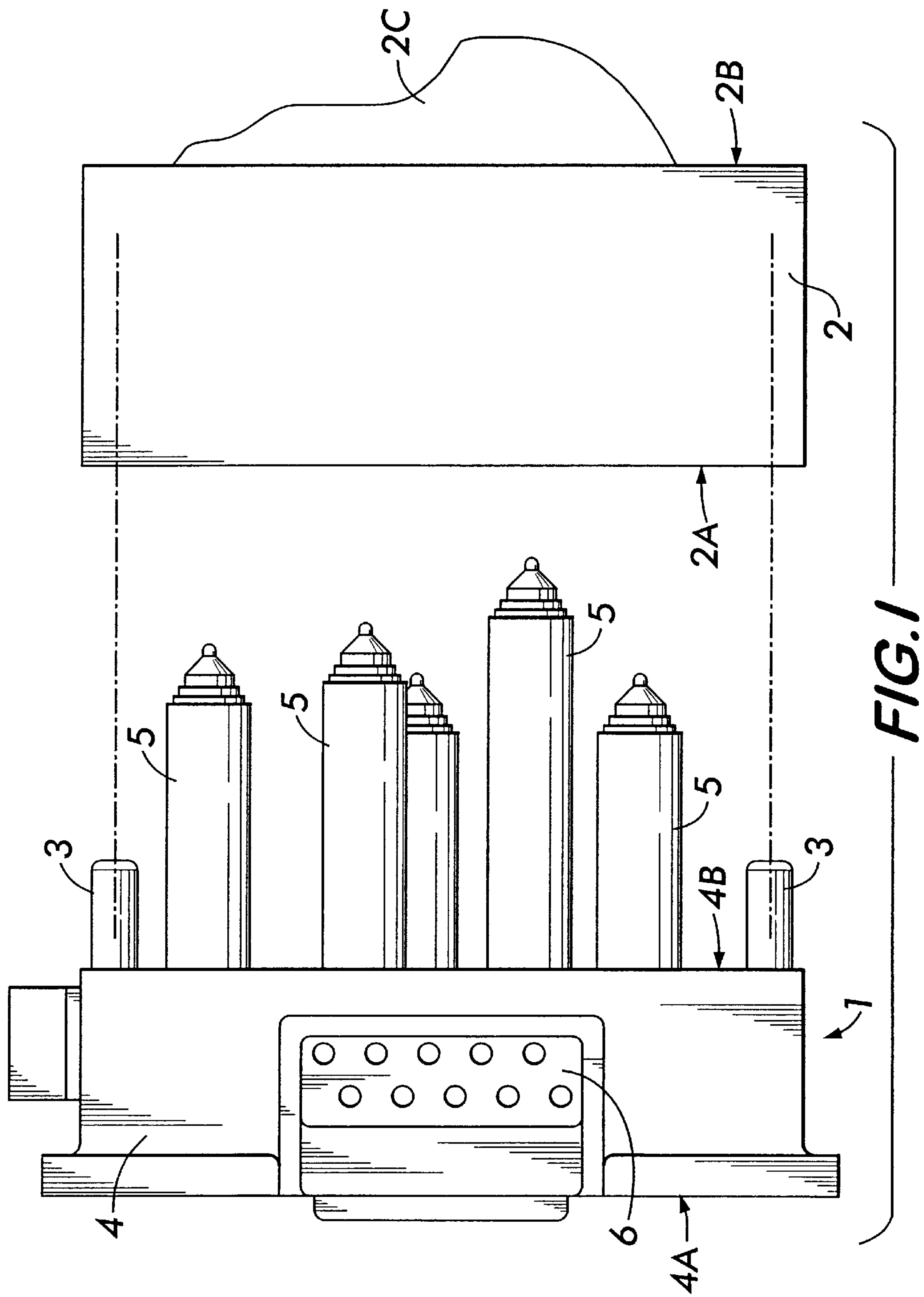
FIG. 1 shows a side view of an injection assembly positioned in relation to the matrix of the mould and intended to be connected to this matrix.

As shown in FIG. 1, the invention relates to an assembly 1 intended for an injection mould represented solely by the matrix 2.

The injection assembly 1 is secured to the matrix 2, for example by spindles 3 entering into corresponding accommodating means of the matrix 2. The assembly 1 is then rendered integral with the matrix 2 to form just one part which remains integral while the matrix is in use. The assembly 1 may be removed from the matrix 2 to allow operations to be performed on the injection nozzle, or to allow them to be replaced, or the control thereof to be acted upon.

The assembly 1 consists of a bearing plate 4 which bears nozzles 5, in general of different lengths, with or without a shutter, depending on the part to be injected. The nozzles 5 pass through the passages (which are not shown) which are provided in the matrix 2 to reach the interior of the moulding cavity of the matrix, at locations which have been predetermined by the moulder as a function of the part to be produced. By convention, in FIG. 1 the rear face 4A of the bearing plate 4 is located on the left, and the front face 4B on the right, and, in the same manner, the rear face 2A of the matrix 2 is on the left and the front face on the right.

The assembly of the assembly 1 and the matrix 2 is performed by means of the faces 4B and 2A. The front face 4B of the bearing plate is machined to come into contact with the rear face 2A of the matrix 2 and the rear face 2A of the bearing plate is shaped, by machining, to come to be laid flat on the machine bed-plate (which is not shown). The cavity of the mould is located on the right of the front face 2B. Schematically, the matrix comprises a part 2C in relief corresponding to the shape of the part to be injected.

These injecting nozzles 5, 5A (FIG. 7) receive the plastics material via the central nozzle 5B (FIG. 9), via a network of ducts which are, in general, heated, and which are not shown in FIG. 1. These ducts are formed of a heating distributor supporting the nozzles which is, itself, secured to the bearing plate. This distributor will be described in a more precise manner with reference to FIGS. 4 and 6.

The single nozzles 5, without a shutter, discharge the material to be injected, with which they are supplied; whilst the nozzles with a shutter only open and close on command; they are controlled by hydraulic fluid; the heating is performed by a heat-exchanging fluid or, preferably, by an electric heating cord, for heating all the parts in the vicinity of the ducts of the plastics material, ie. the heating distributor and the nozzles themselves; the branchings of the various fluids and the electrical branchings being regrouped on the side of the bearing plate 4, in the vicinity of a connection plate 6.

FIGS. 2 and 3 show, in a more precise manner, an embodiment of a bearing plate 4 and of the location 8 accommodating the heating distributor.

Figure 4:
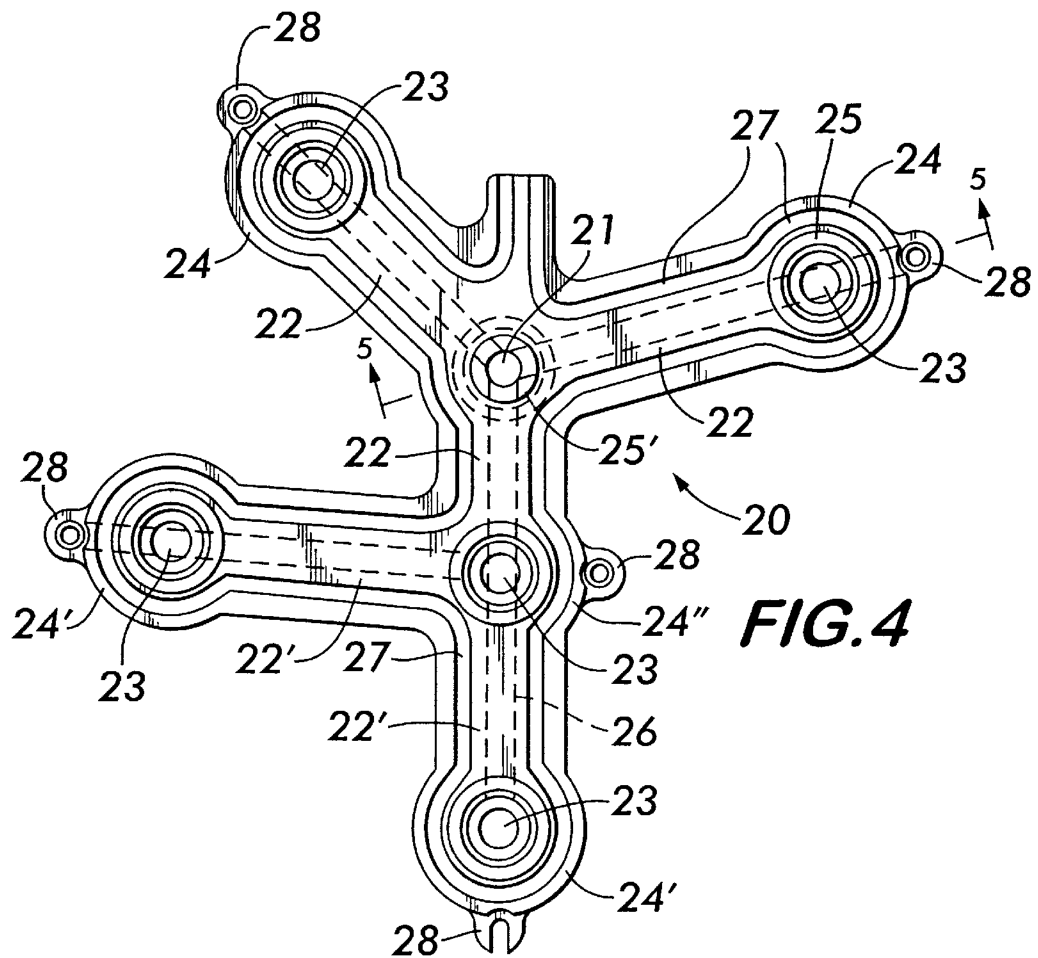
FIG. 4 shows a top view of a heating distributor intended to a bearing plate according to FIG. 2.
Figure 6:
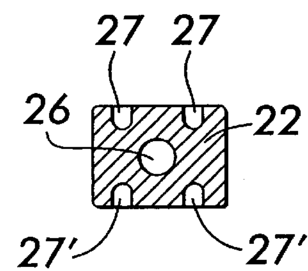
FIG. 6 shows a transverse section of a branch connecting two connectors.

FIGS. 4 and 6 show a heating distributor 20 intended to be mounted in the bearing plate 4.

As shown in FIGS. 2, 3 the bearing plate 4, laid on its rear face 4A, horizontally, is a cast iron or moulded steel part provided with reinforcing ribs 9 leaving, between them, cavities 9A and a reserved space 8 corresponding to the location intended for the accommodation of the heating distributor (which is not shown in FIG. 2 and 3).

The base of the reserved space 8 comprises passages 10 for the injection nozzles and a passage 11 for the supply nozzle.

In the example shown, the passages 10 are stepped and their opening into the reserved space 8 is bordered by a supporting face 13.

The base of the reserved space 8 also comprises internal screw threads 17 for the securing screws of the distributor.

This reserved space 8 likewise comprises passages 10 for the distribution nozzles 5A and for the passage 11 for the central nozzle 5B, ie. the nozzle against which the output of the barrel extruder supplying the plastics material is to be positioned.

These various passages 10, 11 are provided with precise locations intended for the injection nozzles. These locations are selected by the moulder as a function of the part to be produced, ie. its shape, its geometry, its volume and the properties of the plastics material being used. Bosses, which surround the passages, are produced in the reserved space corresponding substantially to the shape of the distributor. This hollow part 8 comprises, in the vicinity of the location of the nozzles, supporting faces 13 connected by the bosses shaped to accommodate the heating distributor in a precise manner.

The bearing plate 4 is a cast iron or moulded steel part, of which only the reference faces are machined. This is, for example, the face 4B by means of which the bearing plate 4 is supported on the matrix 2 and, depending on the case, the lower or rear face 4A pressed against the bed-plate of the machine (FIG. 1).

The supporting face 13 surrounding the locations of the nozzles are likewise machined, in the same manner as the passages for the nozzles (10,11).

The peripheral edge 16 and the ribs 9 of the bearing plate are designed to confer the necessary rigidity on the bearing plate 4, whilst leaving empty spaces which are as large as possible to lighten the assembly.

Preferably, the bearing plate has a thickness which allows injection nozzles and their control means (valves), which are borne by the bearing plate or directly by the heating distributor, to be accommodated, as well as the various fluid ducts and the electric cables.

As shown in FIG. 4, the heating distributor 20, which forms part of the assembly according to the invention, shown by way of example, is likewise a cast iron or moulded steel part.

The heating distributor 20 is a mechanical support independent of the bearing plate 4; it bears the injection nozzles 5A and the central nozzle 5B connected to the injection nozzles 5A by a network of ducts through which the molten plastics material passes.

The shape of the heating distributor 20 is designed as a function of the distribution of the position of the injection nozzles 5A.

The central nozzle 5B is positioned by the moulder to ensure the shortest and most uniform distribution possible of the plastics material between the various injection nozzles 5A taking into consideration the proper operation of each nozzle.

In general, the heating distributor 20 has a shape radiating outwards from the centre, formed by the location 21 of the central nozzle 5B. The branches 22 which connect the location 21 to the locations 23 of the injection nozzles 5A are, in general, direct; they may, however, likewise have branchings 22'.

In more detail, the heating distributor 20 consists of connectors 24, 24', for the positioning of central nozzles 5B and injection nozzles 5A. The connectors 24, 24' of the injection nozzles are connected to the connector 24" of the central nozzle by branches 22, 22'.

In this example, the connectors 24, 24', 24" have standard stepped apertures 25,25' accommodating the nozzles which are not shown and the branches 22 connecting them are provided with ducts 26 opening out into the apertures 25, 25' of the connectors 24, 24', 24".

In the foundry, the distributor 20 is provided with grooves 27,27' along the contour of the branches 22 and the connectors 24, 24', 24". These grooves 27, 27' are provided on the upper face and on the lower face of the distributor 20 to accommodate an armoured and closed electrical resistance intended to keep the distributor at the temperature which is necessary for the fluidity of the plastics material.

The heating distributor 20 is likewise provided, at the foundry, with perforated tabs 28 allowing the distributor 20 to be screwed onto its location in its reserved space 8 of the bearing plate 4 where inner threads 17 are provided to accommodate the screws.

The connectors 24, 24', 24" which accommodate the injectors, which are not shown, have a contour largely formed of a type of revolution; they are provided with an aperture 25, 25', preferably a stepped aperture, forming a chamber. Each injector is secured in a leaktight manner in its connector in such a manner as to communicate with the chamber, which itself communicates with a duct 26 connected to the central nozzle 5B.

Since the heating distributor is a cast iron or moulded steel part, the ducts 26 are produced by apertures opening out at the exterior (26'); these perforated parts 26' are covered so that only the ducts 26 remain, these ducts connecting, for example, the central nozzle 5B to the corresponding distribution nozzle 5A.

The heating distributor 20 is connected to the bearing plate 4 only in the vicinity of the supports 13 with the interposition of insulating washers to avoid a heat bridge between the distributor 20 and the bearing plate 4.

Figure 5:
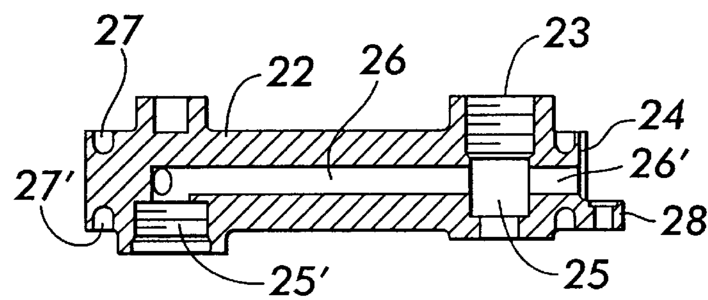
FIG. 5 shows a sectional view along V—V of the distributor in FIG. 4.

The view in section in FIG. 5, passing through the connector 21" of the central nozzle 5B and the connector 24 of an injection nozzle 5A shows the stepped aperture 25 accommodating the central nozzle (which is not shown) opening out via the rear face of the distributor 20 (loser face in FIG. 5). This aperture 25' communicates with a duct 26 connected to the stepped aperture 25 of the connector 24 of the injection nozzle. This aperture opens out from the distributor via the extension 26', having served to produce the duct 26.

All the nozzles 5A, 5B are mounted in the standard threaded accommodating means.

The branches 22, containing the ducts 26, have a rectangular section as is shown in FIG. 6. This rectangular section shows the duct 26 and the grooves 27, 27' in the faces, for example the top and bottom faces of the branch 22. These grooves 27,27' accommodate the armoured and closed electrical resistances.

Figure 7:
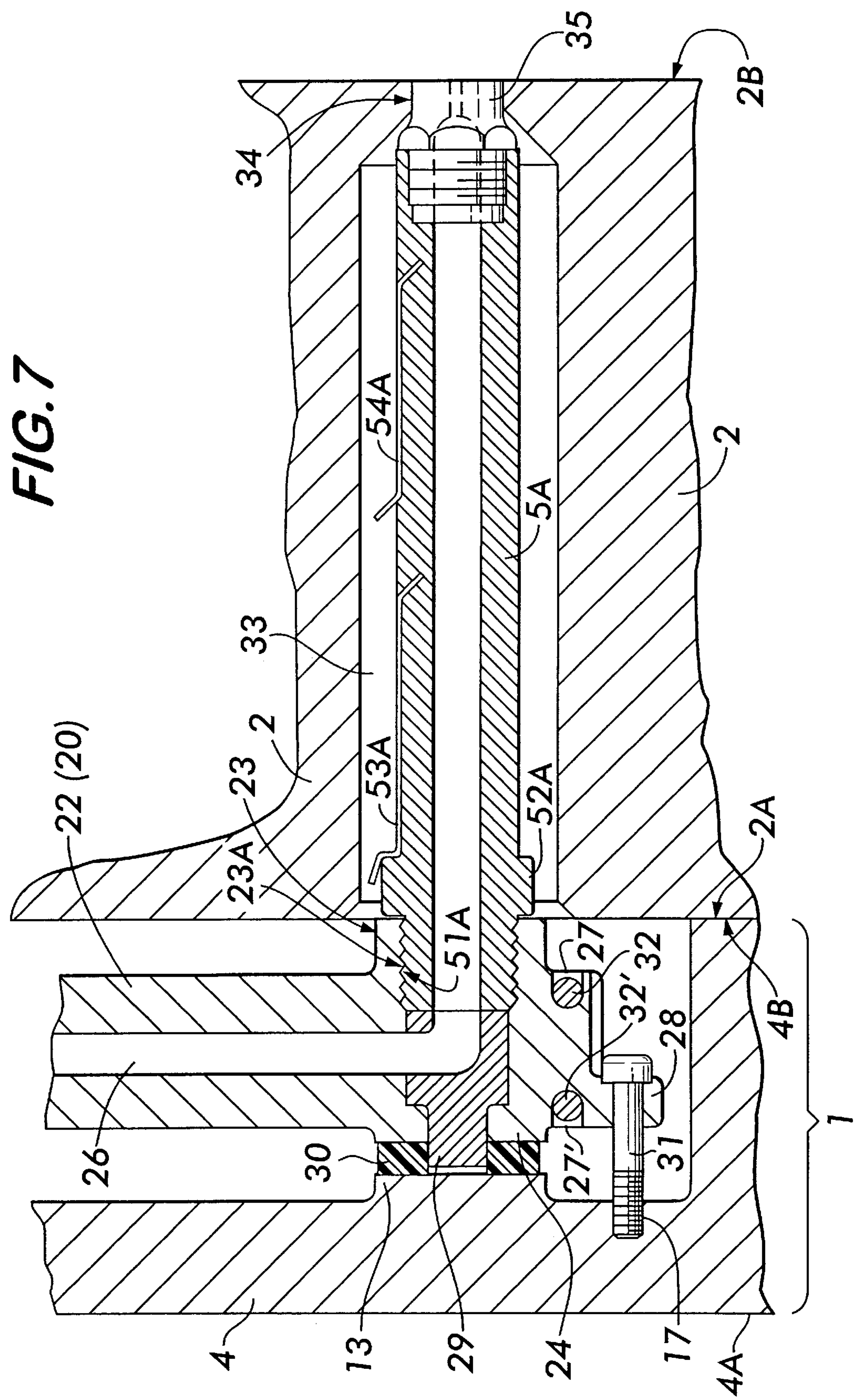
FIG. 7 shows a section of the bearing plate, the injector and the matrix.

FIG. 7 is a partial section of the injection assembly 1 connected to the matrix 2, in the vicinity of an injection nozzle 5A, the assembly being shown in a vertical position as in FIG. 1. The heating distributor 20 is provided, in the vicinity of the connector 24, with an elbow 29 extending beyond the rear face of the distributor to accommodate an insulating washer 30 separating the distributor 20 from its support 13 at the base of the bearing plate 4. The distributor/bearing plate assembly is connected by screws 31.

The elbow 29 opens out into the duct 26 of the distributor, the grooves 27, 27' of which are provided with armoured and closed electrical resistances.

The armoured and closed upper and lower electrical resistances 32, 32' are located in the corresponding grooves 27, 27' of the connector 24.

The passage 33 for the nozzle 5A in the matrix 2 of the mould is terminated at the front by an aperture 34 for centering and for supporting the front end 35 of the nozzle, simultaneously ensuring the leaktightness. At the rear, the nozzle 5A comprises a threaded part 51A screwed into the inner thread 231 of the location 23 of the nozzles on the distributor 20. The threaded part 51A is preceded by a hexagonal part 52A forming a nut for the screwing of the nozzle 5A into the distributor 20. This figure also shows the temperature sensors 53A, 54A.

This section shows the thermal decoupling between, on the one hand, the heating distributor 20 and its nozzle 5A, and, on the other hand, the bearing plate 4 and the matrix 2.

Figure 8:
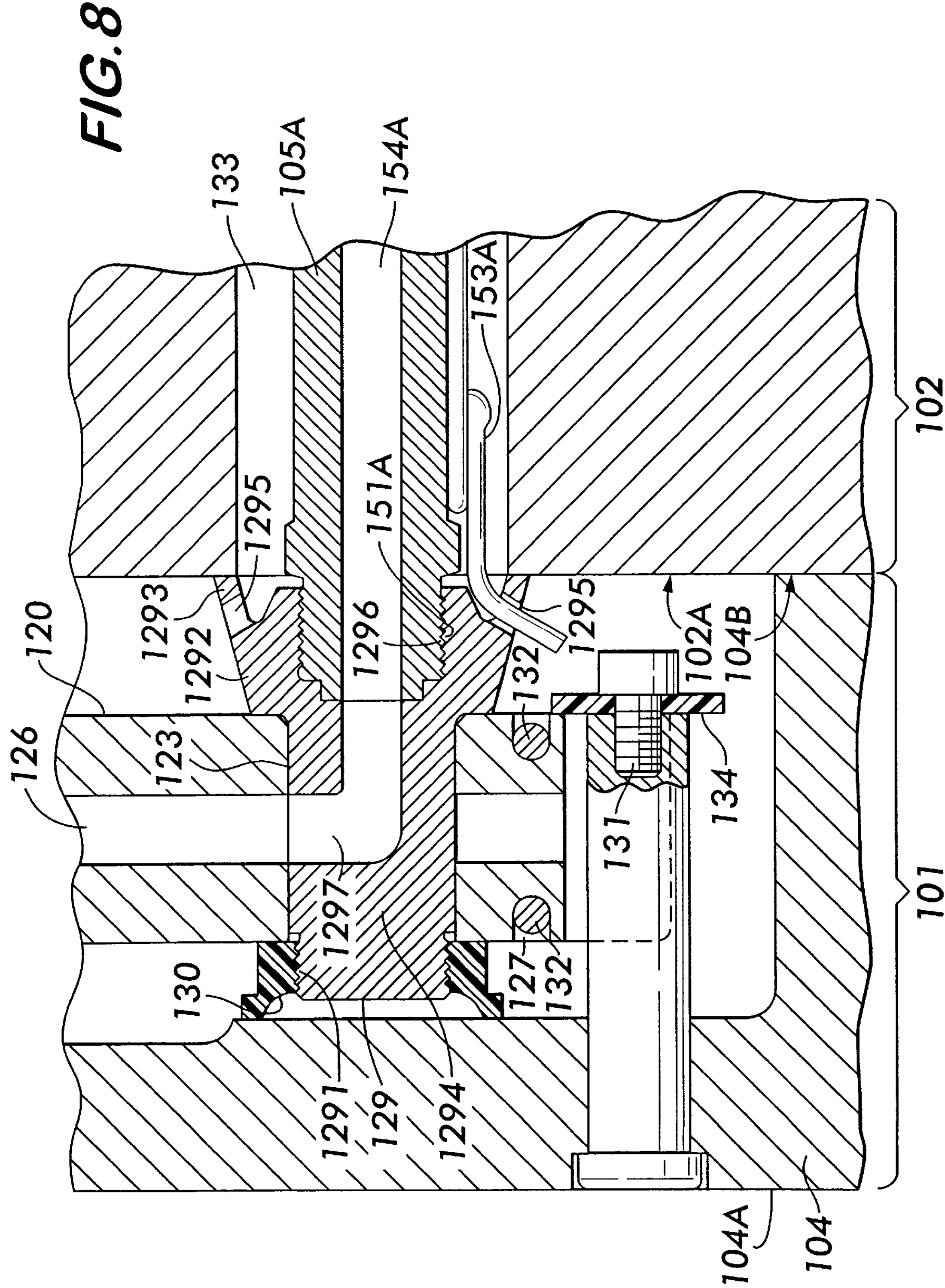
FIG. 8 shows a variant of the embodiment and the mounting of an injector in a distributor and a bearing plate.

FIG. 8 is a sectional view analogous to that in FIG. 7 but corresponding to a variant of the embodiment, and of the mounting of the heating distributor 120 and of the injection nozzle 105A.

The injection assembly 101 is connected to the matrix 102 by means which are not shown. For the mounting of the nozzle 105A in the distributor 120, the location 123 is a non-stepped through aperture accommodating a head 129 with a passage in the form of an elbow to connect the duct 126 of the distributor 120 to the nozzle 105A.

This head 129 allows simplification of the shape and the embodiment of the distributor 120, the nozzle locations of which, such as the location 123, are simple through apertures, not stepped and not threaded.

The head 129, which is identical for all the injection nozzles 105A, irrespective of the length thereof, is a cylindrical part terminated on one side by a threaded part 1291 and on the other side by a frustoconical skirt 1292, closing at its base, a supporting face 1293 corresponding to the rear face 104B of the bearing plate 104 to come to be supported against the front face 102A of the matrix 102, about the passage 133 accommodating the nozzle 105A in the matrix 102. The body 1294 of the head 129 has a circular cylindrical shape adapted to the aperture 123; the length of the body corresponds substantially to the thickness of the distributor 120. The skirt 1291 forms a shoulder at its connection to the body 1294 to support the head against the corresponding face of the distributor 120 ("lower" face).

The other threaded face 1292 accommodates a nut 130 ensuring the clamping of the head 129 on the bearing plate 120 and acting for the support of the distributor against the base of the bearing plate 104. This nut 130 is preferably produced of a material which is of low heat conductivity to insulate the distributor in relation to the bearing plate 104.

The skirt 1292 is provided with passages 1295 for the passage of the cables of the sensors 153A of the nozzle 105A.

In the interior, the skirt 1292 is provided with a threading 1292 for accommodating the threaded end 151A of the nozzle 105A.

The head 129 comprises a passage 1297 communicating with the passage 154A of the nozzle 105A. The part 129 reduces the heat bridges to a minimum.

The mounting of the nozzles in the distributor 120 simplifies, considerably, the construction thereof which has a constant thickness and through apertures which are not stepped and not threaded. This likewise facilitates the operations on the distributor and, more generally, on the assembly 101.

The materials of the distributor 120 and the heads 129 are selected in a more precise manner according to their functions; the part 129 may be treated so as to be resistant whereas this is not essential for the distributor 120.

As is the case in the preceding embodiment, the distributor comprises heating resistances 132 accommodated in grooves 127.

Lastly, the distributor 120 is connected to the bearing plate 120 by a bolt 131, with the interposition of an insulating washer 1311.

Figure 9:
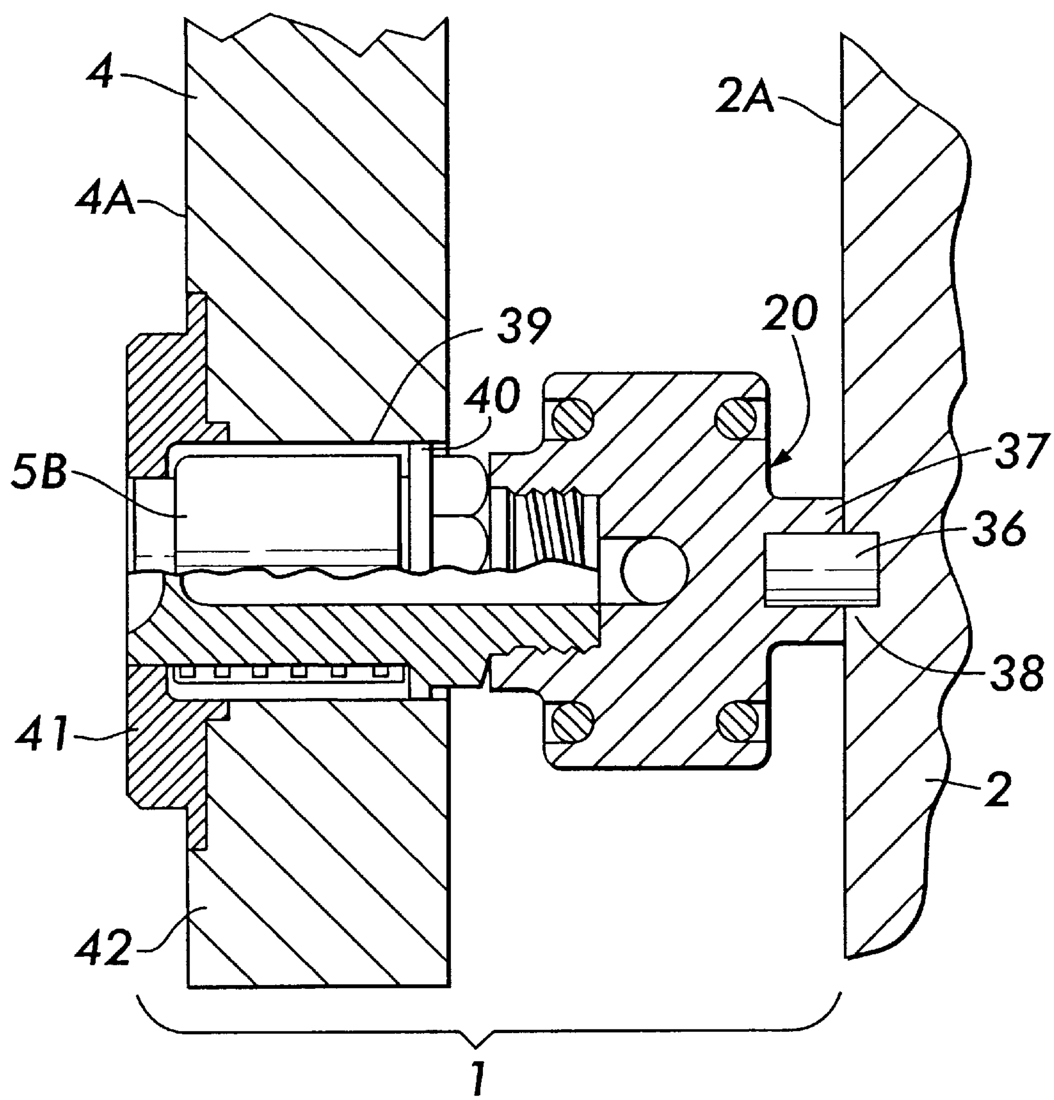
FIG. 9 shows a section of a central nozzle.

FIG. 9 is a partial section of the injection assembly 1 and of the matrix 2 passing via the axis of the central nozzle 5B. To the right of the central nozzle 5B, the heating distributor 20 comprises a centering and bearing pin 36 engaged in an accommodating means 37 of the distributor and an aperture 38 in the matrix 2.

The central nozzle 5B is held in the passage 39 of the bearing plate 4 by its edge 40 at the inner side and by its cap 41 in a countersinking 42 of the rear face of the bearing plate 4.

In a variant which is not shown, the central nozzle may likewise be mounted in the distributor 20 as is the case in the example shown in FIG. 8 for the injection nozzle, by adapting the duct produced in the head 129 to cause it to open out via the face of the threaded end 1291 and by closing the end at the interior of the skirt 1292.

This allows all the locations of the nozzles to be rendered uniform and standardised, irrespective of the supply or the injection, and likewise allows the shape of the distributor to be simplified.

The assembly 1 is produced of cast iron or moulded steel for the bearing plate 4 and the heating distributor 20.

The bearing plate 4 is cast in a mould and then its reference faces 14, 15 are machined in the same manner as the passages 10, 11 of the nozzles and the supporting faces 13 of the heating distributor and the threadings 17.

The supports 13 for the distributor 20 are produced by a hollow at the base of the impression acting as the mould of the bearing plate 4. The arrangement of the ribs 9 takes the shape of the heating distributor 20 into account.

The heating distributor 20 is produced from a mould obtained with the aid of a core formed of modular elements: these modular elements are the elements the shape of which corresponds to the connectors and that of the branches connecting the connectors. The branches are profiled sections, cut to length and assembled.

The core which is produced in this manner forms the impression of the mould of the distributor. The machining of the distributor is restricted to that of the reference faces, the apertures forming the ducts and the stepped apertures, through which the nozzles may or may not pass.

The assembly of the injection assembly 1 consists in mounting the nozzles 5A,5B, in connecting the supplies of the valves, in the case of controlled nozzles, on the heating distributor and in positioning the armoured and closed electrical resistances 32,32' and the electrical branching thereof, as well as the temperature sensors.

After the mounting thereof, the distributor 20 is secured in the bearing plate 4 which is, itself, connected to the matrix 2.

I claim:

1. An injection assembly for a plastics material injection mould, comprising:

injection nozzles for injecting a plastics material into a mould; said nozzles being supplied with plastics material through supply ducts which flowably connect the injection nozzle or nozzles to at least one central nozzle, wherein said central nozzle is supplied from a source of plastics material;

said injection assembly being connectable to an injection mould matrix, said matrix being a portion of a plastics material injection mould wherein the matrix comprises at least one passage for an injection nozzle into the mold cavity; said injection assembly being characterised in that it comprises a bearing plate to which a heating distributor is removeably attached, said heating distributor being provided with injection nozzles;

the bearing plate being a moulded ferrous part comprising reinforcing ribs, a space for accommodating the heating distributor, and positioning supports for said heating distributor;

the heating distributor being supported on the bearing plate and comprising supply ducts connected to at least one central nozzle and to at least one injection nozzle, said heating distributor also comprising connectors accommodating the nozzles and in the vicinity of said nozzles the heating distributor; wherein the structure of the heating distributor surrounding the supply ducts forms a branch or branches of the heating distributor, said branches connecting the connectors of the injection nozzles and the connector of the central nozzle; and means for heating the supply ducts of the heating distributor.

2. An injection assembly according to claim 1, characterised in that the bearing plate further comprises passages for the injection nozzles.

3. An assembly according to claim 1, characterised in that the branches of the heating distributor have a rectangular section, through which passes, approximately in the center thereof, an aperture constituting the supply duct and comprising, in at least one exterior surface of the branch, grooves for receiving a means for heating the supply ducts of the heating distributor, said means comprising an armoured and closed electrical resistance element.

4. An assembly according to claim 3, wherein each branch further comprises four grooves in the exterior surface of the branch to accommodate a means for heating the supply ducts of the heating distributor, said means comprising armoured and closed electrical resistance elements, said grooves being uninterrupted around the connectors.

5. An assembly according to claim 1, characterised in that the connectors are in the shape of a solid of revolution.

6. An assembly according to claim 1, characterised in that the heating distributor comprises perforated tabs to secure the heating distributor to the bearing plate.

7. An assembly according to claim 1, characterised in that the heating distributor is supported on the bearing plate by intercalated heat insulation elements.

8. An assembly according to claim 1, characterised in that the heating distributor also comprises a means for controlling the operation of injection nozzles with shutters.

9. An assembly according to claim 1, wherein said heating distributor further comprises nozzle apertures through the heating distributor at the locations where injection nozzles are connected to the heating distributor, said apertures sized to accomodate injection nozzles.

10. An assembly according to claim 9, further comprising injection nozzles with end portions, said end portions comprising a threaded end, a body, and a skirted end, said body further comprising a passage formed to allow the flow of plastics material from the duct in the heating distributor to the injection nozzle.

11. An assembly according to claim 10, wherein the skirted end of the end portion further comprises an end directed towards the body of the end portion and an end directed towards the injection nozzle, wherein said end directed towards the body portion of the end portion is of greater size than the nozzle aperture in the heating distributor.

12. An assembly according to claim 11, wherein the injection nozzle is attached to the heating distributor by inserting the end portion through the nozzle aperture in the heating distributor, and wherein the threaded end of the end portion is held within the nozzle aperture by a threaded fastener engaged to the threaded end and by the skirted end being engaged against the heating distributor.

13. An assembly according to claim 12, wherein the portion of the skirted end directed toward the injection nozzle is of greater size that the passage for the injection nozzle in the matrix, and wherein said end forms a shoulder to engage the corresponding surface of the matrix.

* * * * *